(12) United States Patent
He

(10) Patent No.: US 7,848,323 B2
(45) Date of Patent: Dec. 7, 2010

(54) METHOD FOR TRANSPORTING DATA PACKETS, DATA NETWORK SYSTEM, AND NETWORK NODES

(75) Inventor: Jianfei He, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 77 days.

(21) Appl. No.: 12/107,562

(22) Filed: Apr. 22, 2008

(65) Prior Publication Data

US 2008/0232366 A1 Sep. 25, 2008

Related U.S. Application Data

(63) Continuation of application No. PCT/CN2006/003199, filed on Nov. 28, 2006.

(30) Foreign Application Priority Data

Nov. 28, 2005 (CN) .................. 2005 1 0124044

(51) Int. Cl.
*H04L 12/28* (2006.01)
*H04J 3/16* (2006.01)
*G06F 15/173* (2006.01)

(52) U.S. Cl. .................. 370/389; 370/467; 709/241

(58) Field of Classification Search .......... 370/353, 370/354, 356, 389, 392, 395.1, 465, 467; 709/230, 241
See application file for complete search history.

(56) References Cited

U.S. PATENT DOCUMENTS 6,295,296 B1 * 9/2001 Tappan ................ 370/392

7,447,233 B2 * 11/2008 Narad et al. ............ 370/473
7,496,096 B1 * 2/2009 Dong et al. ............ 370/392
7,586,947 B2 * 9/2009 Miki et al. ............ 370/469
2001/0002908 A1   6/2001 Rune et al.

(Continued)

FOREIGN PATENT DOCUMENTS

| CN | 1633105 A | 6/2005 |
|----|-----------|--------|
| CN | 1691666 A | 11/2005 |
| WO | WO 01/43372 A1 | 6/2001 |

OTHER PUBLICATIONS

Office action for related China Patent Application No. 2005101240446.

(Continued)

*Primary Examiner*—Aung S Moe
*Assistant Examiner*—Awet Haile
(74) *Attorney, Agent, or Firm*—Leydig, Voit & Mayer, Ltd.

(57) ABSTRACT

A method for transporting data packets, a data network system and network nodes are provided. According to the present invention, subframes are classified according to their forwarding paths when entering a network from an ingress node; subframes with the same forwarding path are encapsulated into a multiframe; the multiframe is transported via intermediate nodes; and the multiframe is de-encapsulated into the original subframes at an egress node. According to the present invention, traffic to enter the network is processed at an edge node of a network, so that small data packets (subframes) are encapsulated into a large data packet (multiframe) for increasing a minimum data packet length, and the subframes are recovered from the multiframe when the traffic exits the network for reducing the burden of traffic processing in a transport network.

12 Claims, 7 Drawing Sheets

U.S. PATENT DOCUMENTS

| | | | |
|---|---|---|---|
| 2004/0156313 | A1 | 8/2004 | Hofmeister et al. |
| 2005/0175341 | A1* | 8/2005 | Ovadia .................. 398/43 |
| 2006/0153089 | A1* | 7/2006 | Silverman .............. 370/252 |
| 2007/0258457 | A1* | 11/2007 | Sakamoto et al. ......... 370/392 |
| 2009/0175278 | A1* | 7/2009 | Harel et al. ............. 370/395.1 |

OTHER PUBLICATIONS

"Generic Framing Procedure (GFP); G.7041/Y.1303 (08/05)," ITU-T Standard In Force (I), *International Telecommunication Union*, Geneva, G.7041/Y.1303 (Aug. 22, 2005).

Lindell et al., "Waypoint—A Path Oriented Delivery Mechanism for IP Based Control, Measurement, and Signaling Protocols," *IETF*, Internet Draft, 1-9 (Nov. 2000) http://tools.ietf.org/html/draft-lindell-waypoint-00.

Liu et al., "IP Multicast Inline Real Stream Monitoring," *IETF*, Network Working Group (Draft), 1-14 (Oct. 19, 2009) http://tools.ietf.org/id/draft-liu-mboned-multicast-realstream-monitor-00.txt.

Shen et al., "NSIS Operation Over IP Tunnels," *IETF*, Next Step in Signaling (Internet Draft) 1-26 (Dec. 3, 2009) http://www.ietf.org/id/draft-ietf-nsis-tunnel-07.txt.

* cited by examiner

METHOD FOR TRANSPORTING DATA PACKETS, DATA NETWORK SYSTEM, AND NETWORK NODES

CROSS-REFERENCE TO RELATED APPLICATIONS

This application is a continuation of International Patent Application No. PCT/CN2006/003199, filed Nov. 28, 2006, entitled "METHOD FOR TRANSPORTING DATA PACKETS," which claims the benefit of the People's Republic of China Application No. 200510124044.6, filed on Nov. 28, 2005, entitled "METHOD FOR TRANSPORTING DATA PACKETS," both of which are hereby incorporated by reference in their entirety.

FIELD OF THE INVENTION

The present invention relates to the field of data transport in data networks, and in particular, to a method for transporting data packets, a data network system and network nodes.

BACKGROUND OF THE INVENTION

With the steady development of communication technologies, data network line speed has increased gradually from 100 Mbps to 1 Gbps, 10 Gbps and 40 Gbps. As the line speed increases, the operating speeds of data processing devices in communication networks are required to increase correspondingly. FIG. 1 shows a typical data processing procedure including flow classification (Block 110), traffic policing (Block 120), output port searching (Block 130) and output scheduling (Block 140), etc., each having to process packet by packet, thus imposing a heavy burden on the data processing devices if data packet traffic comes with a quite high speed.

As described above, all of the existing data processing devices process the data from line cards on a packet basis. The length of the data packets is unpredictable. For example, a minimum packet length of 64 bytes is defined in an Ethernet network. Generally, data processing devices are designed to be able to forward a minimum packet length at a line speed. For example, for a 10 G line card, if the packet length is 64 bytes, the time needed to perform a table lookup is 64*8 bit/10 Gbps, i.e. about 50 ns; for a 40 G line card, the time needed to perform a table lookup is 12.5 ns; and for a 100 G line card, the time needed to perform a table lookup is 5 ns. In other words, processing data on a packet basis imposes a heavy burden on the data processing devices.

Although the time needed to perform a table lookup can be reduced by increasing the access speed of storage devices, high-speed storage devices result in the increasing cost and power consumption of the data processing devices. As a result, the cost of data network systems increases.

SUMMARY OF THE INVENTION

The invention provides a method for transporting data packets, a data network system and network nodes, which results in a reduced burden on data processing devices and enables low-cost packet transport.

A method for transporting data packets includes encapsulating subframes with the same forwarding path into a multiframe when subframes enter a network from an ingress node, transporting the multiframe via intermediate nodes and de-encapsulating the multiframe into the subframes with the same forwarding path at an egress node.

A network node includes a subframe analyzing unit for analyzing the forwarding path of a subframe when it enters a network from the network node and a multiframe processing unit for encapsulating subframes with the same forwarding path into a multiframe.

A network node further includes a multiframe de-encapsulating unit for de-encapsulating a received multiframe into a plurality of subframes with the same forwarding path when the network node is an egress of the multiframe and a subframe processing unit, for forwarding the de-encapsulated subframes according to the de-encapsulated subframes' labels.

A data network system includes an ingress node for encapsulating subframes with the same forwarding path into a multiframe when subframes enter a network, an intermediate node for transporting the encapsulated multiframe and an egress node for de-encapsulating the multiframe into the subframes.

According to embodiments of the invention, traffic to enter the network is processed at an edge node of a network, so that small data packets (subframes) are encapsulated into a large data packet (multiframe) for increasing a minimum data packet length, and the subframes are recovered from the multiframe when the traffic exits the network for reducing the burden of traffic processing in a transport network. For example, if the minimum packet length of the multiframe is 6400 bytes, the packet processing frequency of the inventive device can be reduced to $1/100$ of that of the current device having a minimum packet length of 64 bytes.

DETAILED DESCRIPTION OF THE EMBODIMENTS

Figure 1:
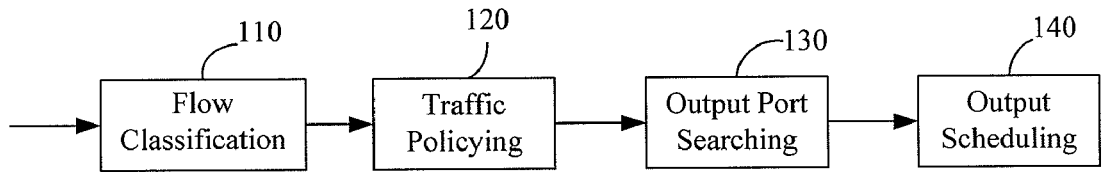
FIG. 1 is a flow chart illustrating a typical data processing procedure.
Figure 2:
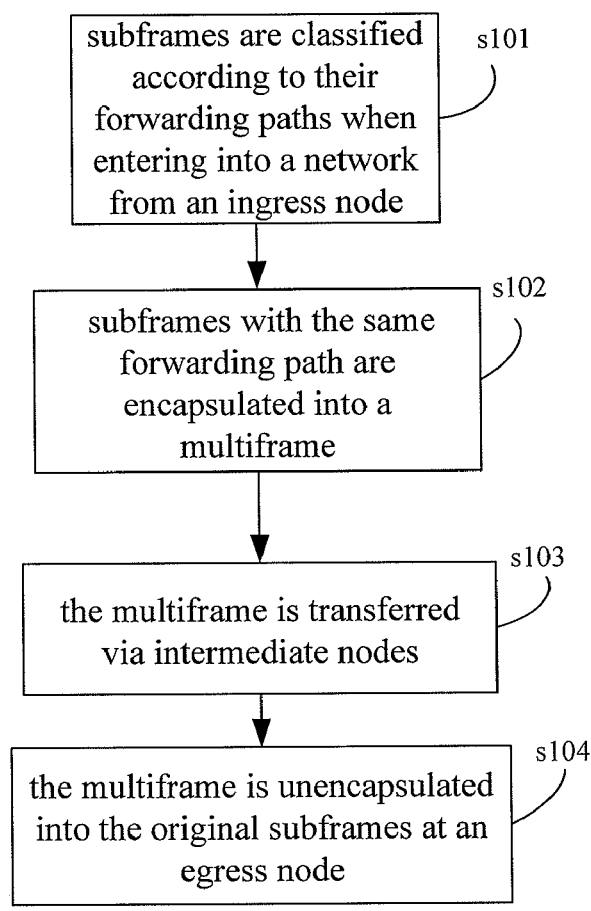
FIG. 2 is a flow chart illustrating a method for implementing a data packet switching network according to an embodiment of the invention.

A method for implementing a data packet switching network according to an embodiment of the invention is described below with reference to FIG. 2.

In Block s101, subframes are classified according to their forwarding paths when entering a network from an ingress node.

The subframes can be any of a variety of subframes, including Ethernet subframes, Internet Protocol (IP) subframes or Multiprotocol Label Switch (MPLS) subframes. Therefore, the forwarding path can be searched according to an IP address, a label in MPLS packet, or at least one of a destination Media Access Control (MAC) address in Ethernet frame and a Virtual Local Area Network (VLAN) label.

Those skilled in the art will appreciate that the method can also be applied to subframes in other data traffic, corresponding characteristic information in the other data traffic, including but not limited to Pseudo Wire (PW) labels, can be used to search the forwarding paths.

In Block s102, subframes with the same forwarding path are encapsulated into a multiframe.

The encapsulating process is now described below. The subframes are encapsulated by employing length indication or GFP, and then the encapsulated subframes are padded into a multiframe, which, in the form of a payload, is encapsulated and mapped to a network transport layer. The network transport layer includes Ethernet, MPLS, and the like.

If the length of bytes padded in the multiframe within a predetermined period of time is shorter than a minimum packet length, the multiframe is padded with extra bytes to the minimum packet length.

In addition, to identify the multiframe in the network, a multiframe identification field can be added to the multiframe. When the multiframe in the form of a payload is mapped to the network transport layer, the multiframe identification field indicates that the multiframe is carried in network transport layer packets. However, if it is specified in the whole network that all packets are multiframe packets, the multiframe identification field is not required.

The length of the multiframe is determined according to a delay constraint and a rated bandwidth for outputting the multiframe. Typically, the minimum multiframe length is predetermined by the whole network, rather than being computed for various services. The minimum multiframe length is typically determined according to the minimum allowed delay of various services on a Provider Edge Device (PE) (denoted as t) and the minimum bandwidth for common source/destination/path services (denoted as B). The minimum multiframe packet length can be approximately designed as B*t.

In Block s103, the multiframe is transported via intermediate nodes.

In addition to forwarding the multiframe on the network transport layer, the intermediate nodes perform traffic policing, priority scheduling, etc. by using network layer information.

In Block s104, the multiframe is de-encapsulated into the original subframes at an egress node.

The de-encapsulating process further includes de-encapsulating the encapsulation on the network transport layer, identifying the multiframe, de-encapsulating the subframes from the multiframe, and performing traffic policing and priority scheduling on the subframes.

Furthermore, when the multiframe formed in Block s102 enters an ingress intermediate node, it can also be multiplexed at the ingress intermediate node in the same manner as Block s101 and Block s102 so as to form a secondary multiframe. The secondary multiframe is correspondingly de-encapsulated at an egress intermediate node. Therefore, a hierarchical data transport network can be formed.

Figure 3:
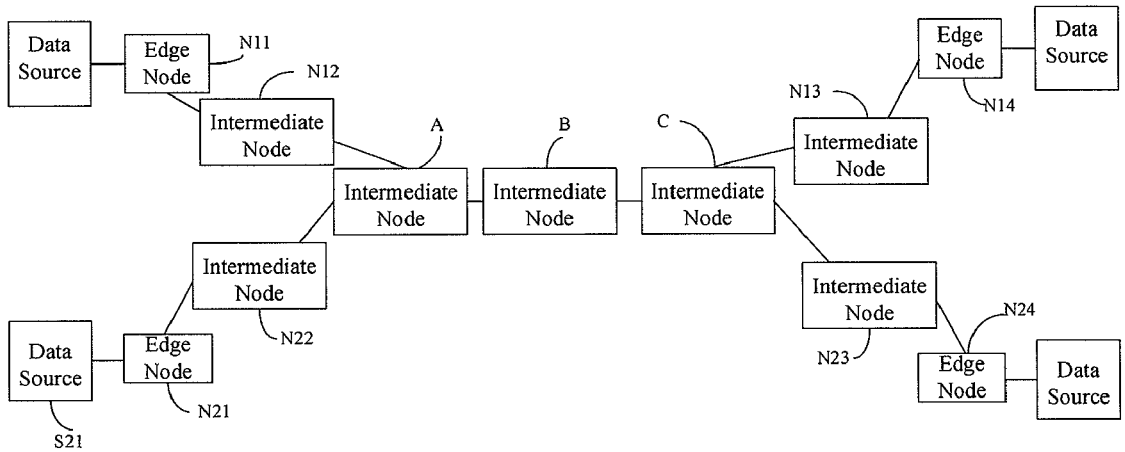
FIG. 3 is a structure diagram of a particular transport network according to an embodiment of the invention.
Figure 4:
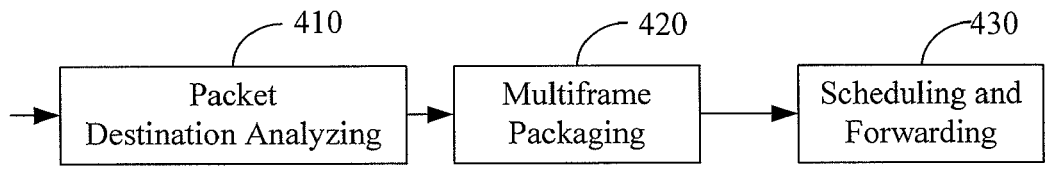
FIG. 4 is a flow chart illustrating a process of encapsulating subframes according to an embodiment of the invention.

The detailed description of an embodiment of the invention will now be given below with reference to FIG. 3. The transport network in FIG. 3 includes edge nodes N11, N14, N21 and N24 as well as intermediate nodes N12, N13, N22, N23, A, B and C. When receiving a data packet that has not been extended from the data source S21, the edge node N21, which serves as an ingress node, encapsulates the data packet (subframe). The encapsulation process as shown in FIG. 4 includes data traffic destination analyzing (Block 410), multiframe packaging (Block 420), as well as scheduling and forwarding (Block 430).

In Block 410, the data packet destination, i.e. the forwarding path of the subframe is analyzed according to characteristic information of service traffic, such as the label in an MPLS packet and the destination MAC address in an Ethernet frame, in particular, by searching the forwarding path corresponding to the traffic and determining those packets that can be encapsulated into a multiframe together with the traffic.

Figure 5:
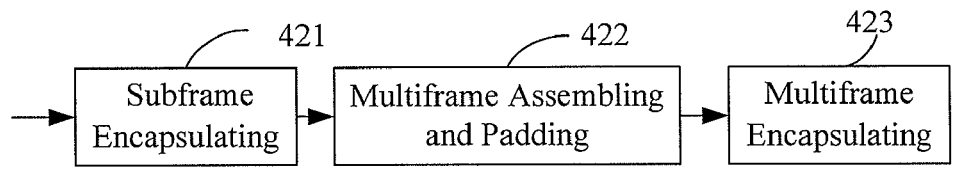
FIG. 5 is a flow chart illustrating a process of packaging a multiframe according to an embodiment of the invention.

In particular, the multiframe package process of Block 420 as shown in FIG. 5 further includes subframe encapsulating (Block 421), multiframe assembling and padding (Block 422), and multiframe encapsulating (Block 423).

Figure 6:
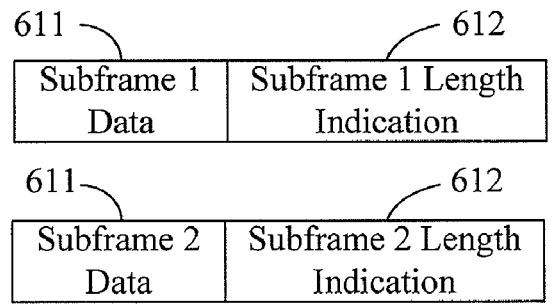
FIG. 6 is a structure diagram of subframes encapsulated by employing a length indication field according to an embodiment of the invention.
Figure 7:
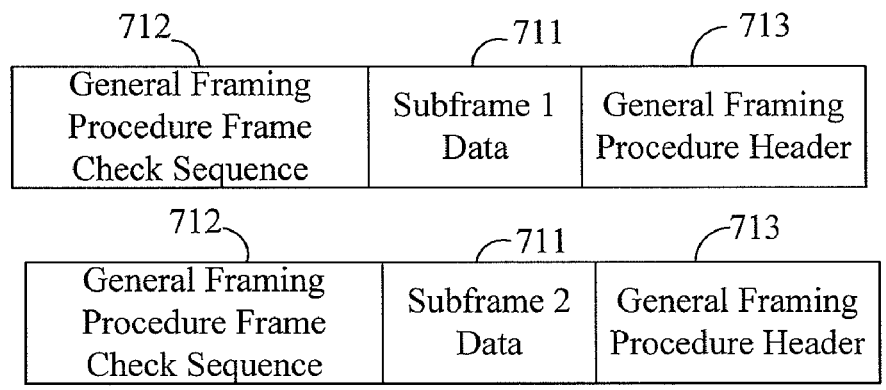
FIG. 7 is a structure diagram of subframes encapsulated by employing General Framing Procedure (GFP) according to an embodiment of the invention.

In the subframe encapsulation process of Block 421, individual subframes are encapsulated, so that they can be sent to an egress node and their location can be identified from the multiframe. In particular, the subframes can be encapsulated by employing a length indication field or GFP. FIG. 6 shows an embodiment in which a length indication field is employed; the subframes are encapsulated by adding a length indication field 612 to a subframe data 611. FIG. 7 shows an embodiment in which GFP is employed; the subframes are encapsulated by adding a GFP Frame Check Sequence (FCS) 712 to the beginning of a subframe data 711 and adding a GFP header 713 to the end of the subframe data 711. As GFP is complete link layer encapsulation, even if an error occurs in one subframe, its subsequent subframes can be re-discovered.

Figure 8:
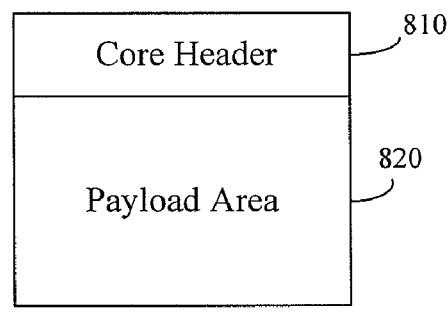
FIG. 8 illustrates a structure and arrangement of a GFP frame according to an embodiment of the invention.
Figure 9:
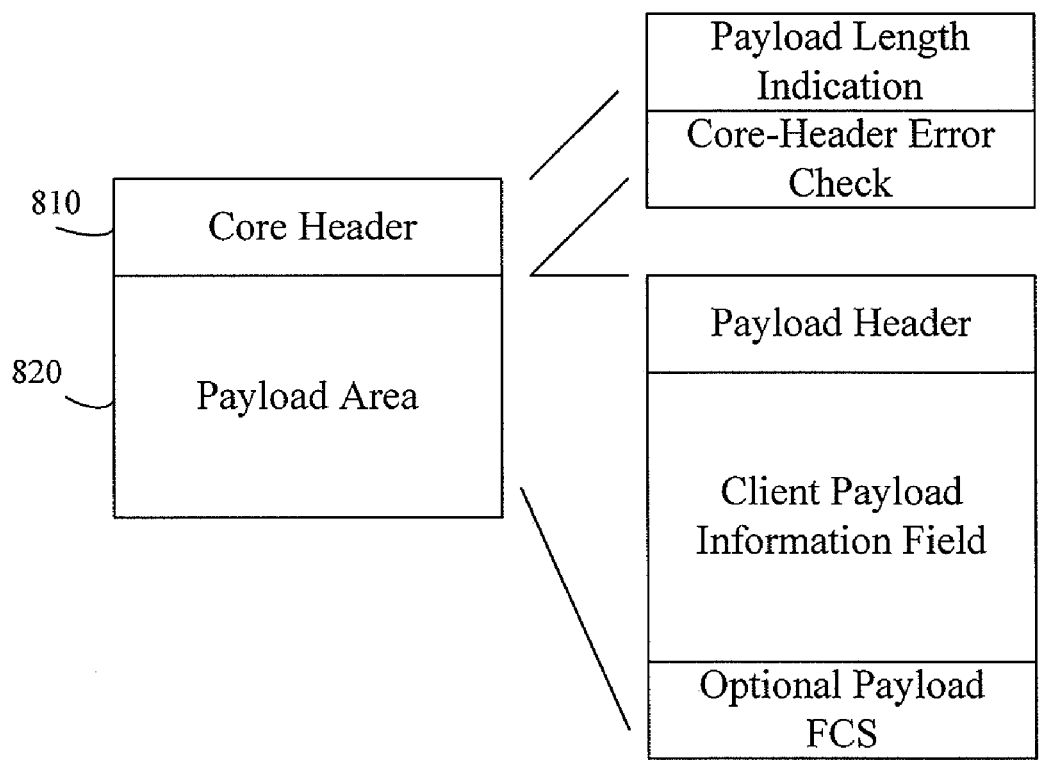
FIG. 9 illustrates a structure of a GFP client frame according to an embodiment of the invention.

In an embodiment of the invention, a GFP frame, which is arranged in bytes, includes a GFP core header 810 and a GFP payload area 820, as shown in FIG. 8 and FIG. 9.

Figure 10:
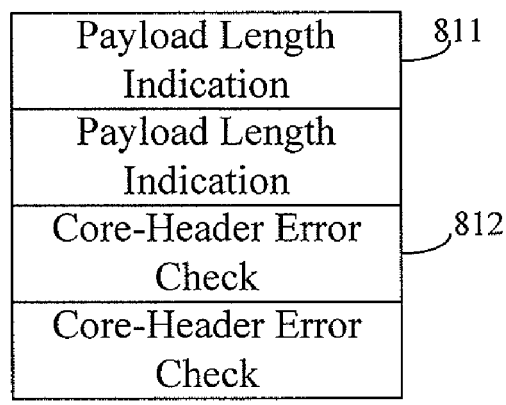
FIG. 10 illustrates a structure of a GFP core header according to an embodiment of the invention.

FIG. 10 shows a GFP core header of 4 bytes according to an embodiment of the invention, including a payload length indication (PLI) 811 of 16 bits and a core header error check (cHEC) 812 of 16 bits. The PLI 811 of 2 bytes represents a total number of bytes contained in the GFP payload area, which has a minimum value of four. The first to the third bytes contained in the GFP payload area are reserved for a GFP control frame. The cHEC 812 of 2 bytes employs CRC-16 check to protect the integrity of the core header. The cHEC can be used to correct single-bit errors and to detect multi-bit errors. The generation polynomial of the cHEC is $G(x)=x16+x12+x5+1$, where an initialized value is 0, the coefficient of x16 is a Most Significant Bit (MSB), and the coefficient of x0 is a Least Significant Bit (LSB). In addition, the core header is scrambled by an exclusive-OR operation (addition module 2) with B6AB31E0. The core header scrambling improves the robustness of the GFP frame delineation procedure and provides a sufficient number of 0-1 and 1-0 transitions during an idle transport process.

Figure 11:
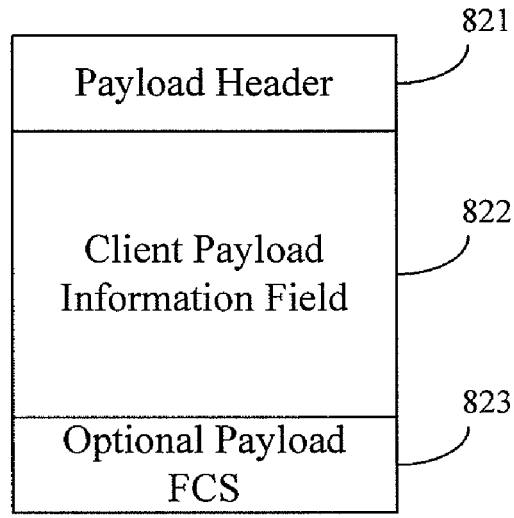
FIG. 11 illustrates a structure of a GFP payload area according to an embodiment of the invention.

The GFP payload area, which contains all bytes except those contained in the GFP core header, is used for transporting high-level client information. This area may have a variable length of 4-65535 bytes, as shown in FIG. 11. The GFP payload area consists of a payload header 821, a client payload information field 822, and, optionally, a payload FCS 823.

Figure 12:
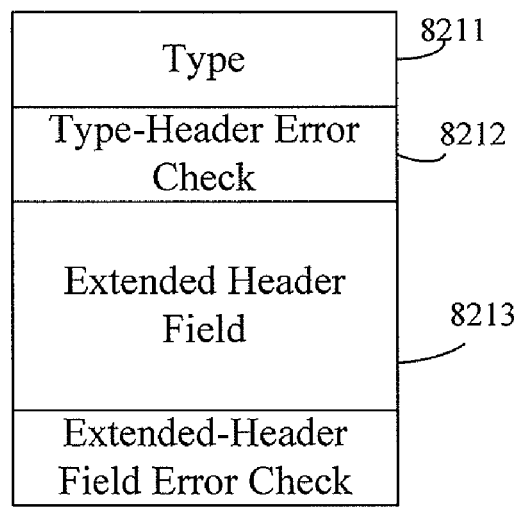
FIG. 12 illustrates a GFP bit transport sequence according to an embodiment of the invention.

The payload header 821, which is an area with a variable length of 4-64 bytes, is capable of managing data links related to high-level client signals. As shown in FIG. 12, the GFP payload header consists of two essential fields, i.e. a type field 8211 and a type-Header Error Check (tHEC) 8212, as well as an optional extended header field 8213 with a variable length. The type field 8211 indicates whether there exists an extended header and its structure, an optional payload FCS, etc. The tHEC 8212 is used for protecting the integrity of the type field. In the multiframe assembling and padding process of Block 422, a plurality of subframes are assembled together in a padding sequence to form a multiframe with a predetermined minimum packet length. If the length of subframes assembled within a predetermined period of time is shorter than a minimum packet length, the data with a length shorter than the minimum packet length is padded to the end of the multiframe. The minimum packet length is selected according to service delay requirements and efficiencies. After assembling, a multiframe header 1 is optionally added to the front of the multiframe.

Figure 13:
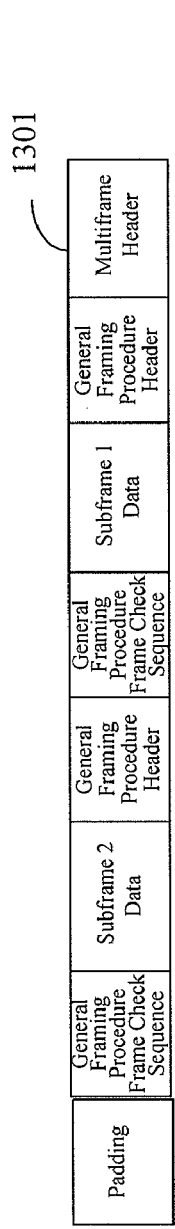
FIG. 13 is a structure diagram of a multiframe after being assembled and padded according to an embodiment of the invention.

If the subframes are encapsulated by using GFP, as shown in FIG. 13, a multiframe header 1301 carries the information used to process the multiframe in a network, such as path information. If the network transport layer is provided with such information, the multiframe header can be eliminated.

In the multiframe encapsulation process of Block 423, the multiframe is mapped to a network transport layer, which provides functions necessary to transport a multiframe in the network, such as connection identification, protection, and Operation Administration Maintenance (OAM). Because there are no special requirements for transporting the multiframe in the network, the transport layer can employ any techniques currently available or developed in the future, such as MPLS and Ethernet.

Figure 14:
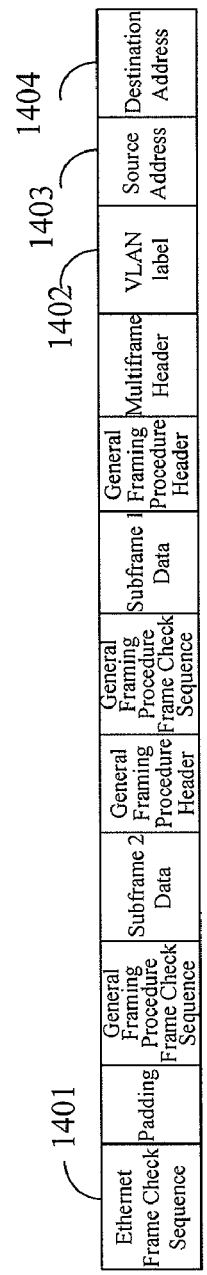
FIG. 14 is a structure diagram of a multiframe mapped to a network transport layer according to an embodiment of the invention.

FIG. 14 shows an encapsulated Ethernet frame, comprising an Ethernet FCS 1401, a VLAN label 1402, a source address 1403 and a destination address 1404.

As described above, such a GFP encapsulation can be replaced by a simple length indication, and the multiframe header is optional.

Intermediate nodes N22 process in the same manner as normal nodes, they need not to know the occurrence of a multiframe and the number of subframes in the multiframe, and only need to forward the multiframe according to requirements of the network transport layer. However, due to the introduction of the multiframe at the edge of the network, the minimum packet length of the connection processed by intermediate nodes N22 is greater than that in normal conditions. Therefore, processing requirements are reduced.

Intermediate nodes A-B-C constitute a higher-level network, which can process a higher-level multiframe referred to as a secondary multiframe herein. The minimum packet length of the secondary multiframe is greater than that of a multiframe transportred by the next-layer nodes, such as nodes N12. Therefore, the processing requirements of these nodes are further reduced. The intermediate node A processes in a similar manner as the node N12, except that it treats the multiframe as a subframe on the node N12. The intermediate node B processes in a similar manner as node N12. The intermediate node C, which is the end point of the secondary multiframe, processes in a similar manner as the next layer node N14, except that it treats the multiframe as a subframe on the node N14.

The intermediate node N13 processes in the same manner as the intermediate node N12.

Figure 15:
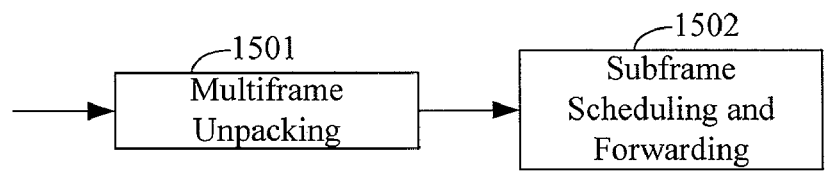
FIG. 15 is a flow chart illustrating a process of de-encapsulating a multiframe by an egress node according to an embodiment of the invention.
Figure 16:
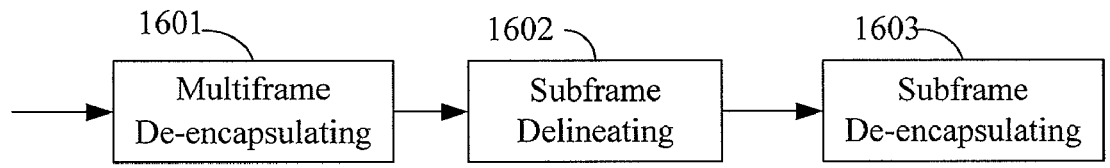
FIG. 16 is a flow chart illustrating a process of multiframe unpacking in FIG. 15.

Lastly, the egress node N14 processes the multiframe by de-encapsulating the multiframe (Block 1501) and scheduling and forwarding subframes (Block 1502), as shown in FIG. 15. The multiframe de-encapsulation process further includes de-encapsulating the multiframe (Block 1601), delineating the subframes (Block 1602) and de-encapsulating the subframes (Block 1603), as shown in FIG. 16.

In the multiframe de-encapsulation process of Block 1601, the multiframe is obtained by de-encapsulating from a specific network layer (such as MPLS and Ethernet).

In the subframe delimitation process of Block 1602, the locations of individual subframes are found in the multiframe in a manner corresponding to the above-described subframe encapsulation process. If the subframes are encapsulated by employing length indication, the first field immediately after the optional multiframe header is the length indication of the first subframe. The last byte of the first subframe is obtained. This last byte is followed by the length indication of the second subframe. The last byte of the second subframe is further obtained, and the like. If it is found that the content of a location where the length indication field should occupy cannot be a reasonable length indication or the content is a preset padding field, the following fields will be regarded as padding bytes, and the multiframe ends.

If the subframes are encapsulated by employing GFP, they can be de-encapsulated by employing methods known to the skilled in the art.

In embodiments of the invention, because the multiframe package process may not be performed until a plurality of subframes have arrived, the multiframe processing may introduce time delays to data flows. The time delays are related to the minimum packet length of the multiframe, as well as traffics of incoming subframes. Also, under a constraint of the time delays, when the bandwidth for the subframes changes, the multiframe may have to be padded with a relatively large number of subframes if there is no sufficient number of subframes to be padded, so as to meet the requirement of the minimum packet length of the multiframe for subsequent transmission, resulting in a decreased bandwidth utilization ratio.

It is assumed that the minimum packet length of the subframes is S, the minimum packet length of the multiframe is T, the traffic bandwidth for the incoming subframes is B, and the bandwidth provided for multiframe output when designing the network is P. When the bandwidth for the incoming subframes is 0 (B=0), because there is no subframe to be transmitted and therefore there is no multiframe to be transmitted, the actual output bandwidth is also 0. When the bandwidth for the incoming subframes is very small, it will be amplified to the rated output bandwidth for the multiframe in the multiframe processing process, and at this point, the time delay introduced by the multiframe processing equals to T/P. When the bandwidth for the incoming subframes exceeds the rated output bandwidth for the multiframe, the output bandwidth for the multiframe approximately equals to that of the subframes, and the difference therebetween is caused by a small number of padding bytes and the overhead for the multiframe encapsulation, at this point, the time delay of the multiframe processing equals to T/Pa, where Pa (>P) is the actual output rate of the multiframe, and the output bandwidth for the multiframe may be limited to a peak PIR set by a network carrier.

According to this characteristic, if the worst condition is taken into consideration, the time delay equals to T/P, where the value of T may be selected according to the time delay requirements and the rate planning of the network. For example, in the case that the time delay requirement of the multiframe processing is less than or equal to 1 ms, the maximum value of T (the minimum number of bytes in the multiframe) proposed for services of different rates are different. Therefore, it is clear that the greater the acceptable delay, the larger the input rate will be, and the bigger the value of T may be set, thus imposing a reduced burden on the processing in the transport network. However, the value of T cannot exceed the maximum packet length supported in the network, which has a typical length of 10K bytes in the current network.

In embodiments of the invention, a plurality of subframes can share the encapsulation on the network transport layer; in other words, a plurality of subframes can be forwarded by sharing the encapsulation of a multiframe inside the network, so that overall encapsulation efficiency can be increased. Utilizing the Ethernet as a network transport technology, the typical encapsulation of Ethernet includes a Destination Address (DA), a Source Address (SA), a Virtual Local Area Network (VLAN) and a Frame Check Sequence (FCS), which are totally 20 bytes. The Ethernet has a standard Ethernet packet interval of 12 bytes, as well as a Preamble and a Start Frame Delineator (SFD) of 8 bytes, and thus has a total overhead of 40 bytes. Therefore, a packet of 64 bytes has an efficiency of 64/(64+40)=61.5%, and an extended packet of 640 bytes has an efficiency of about 640/(640+40)=94%. Therefore, the efficiency is increased significantly.

Figure 17:
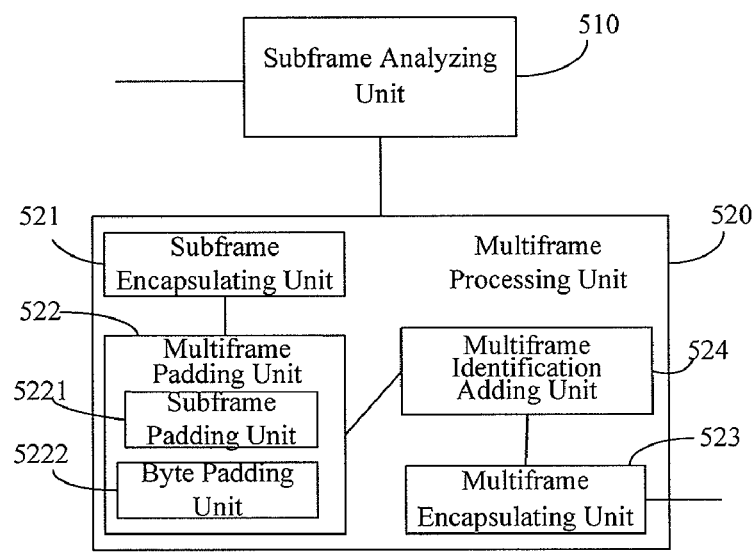
FIG. 17 is a structure block diagram of a network node acting as an ingress node according to an embodiment of the invention.

FIG. 17 shows a structure block diagram of a network node acting as an ingress node according to an embodiment of the invention.

The network node includes: a subframe analyzing unit 510, for analyzing the forwarding path of a subframe when it enters a network from the network node; and a multiframe processing unit 520, for encapsulating subframes with the same forwarding path into a multiframe.

In an embodiment of the invention, the multiframe processing unit 520 includes: a subframe encapsulating unit 521, for encapsulating the subframes; a multiframe padding unit 522, for padding the encapsulated subframes into a multiframe; and a multiframe encapsulating unit 523, for encapsulating the multiframe in the form of a payload and mapping the encapsulated multiframe to a network transport layer.

In view of a service delay constraint and a rated bandwidth for outputting the multiframe, the minimum packet length of a multiframe should be selected. Generally, the minimum packet length of the multiframe is planned in the whole network. For the case that the length of bytes padded within a predetermined period of time is shorter than a minimum packet length, in embodiments of the invention, the multiframe padding unit 522 includes: a subframe padding unit 5221, for padding the encapsulated subframes into a multiframe; and a byte padding unit 5222, for adding padding bytes if the multiframe is not padded up within a predetermined period of time.

In a specific embodiment of the invention, the subframe encapsulating unit 521 can be a length indication encapsulating unit or a GFP encapsulating unit.

Additionally, in order to indicate the carried multiframe on the network transport layer, the multiframe processing unit 520 may also include a multiframe identification adding unit 524 for adding a multiframe identification for identifying a multiframe after padding the encapsulated subframes into the multiframe. However, if it is specified in the whole network that all packets are multiframe packets, the multiframe identification field is not required.

In a specific embodiment of the invention, the subframe analyzing unit 510 can be a searching unit, for searching the forwarding path of the subframe according to a label in an MPLS packet, an IP address, or at least one of a destination MAC address in an Ethernet frame and a VLAN label.

Figure 18:
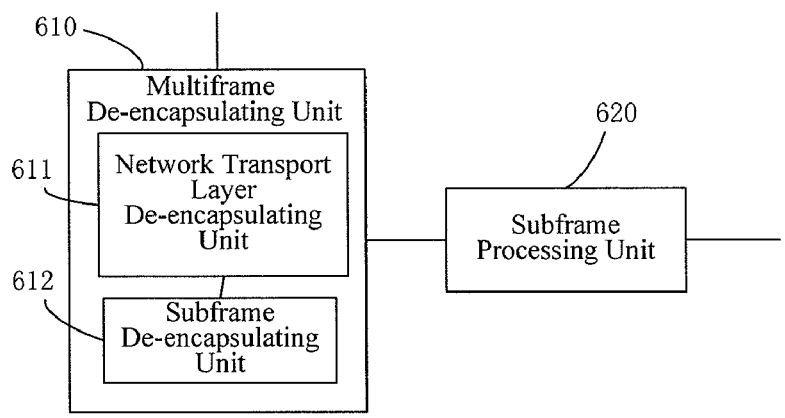
FIG. 18 is a structure block diagram of a network node acting as an egress node according to an embodiment of the invention.

FIG. 18 shows a structure block diagram of a network node acting as an egress node according to an embodiment of the invention.

The network node includes: a multiframe de-encapsulating unit 610, for de-encapsulating a received multiframe into a plurality of subframes with the same forwarding path when the network node is an egress of the multiframe; and a subframe processing unit 620, for processing the de-encapsulated subframes.

The multiframe de-encapsulating unit 610 includes: a network transport layer de-encapsulating unit 611, for de-encapsulating the encapsulation of a multiframe on the network transport layer to obtain the multiframe; and a subframe de-encapsulating unit 612, for de-encapsulating subframes from the multiframe.

In a specific embodiment of the invention, the subframe de-encapsulating unit 612 can be a length indication de-encapsulating unit or a GFP de-encapsulating unit.

Additional advantages and modifications will readily occur to those skilled in the art. Therefore, the invention in its broader aspects is not limited to the specific details and representative embodiments shown and described herein. Accordingly, various modifications and variations may be made without departing from the spirit or scope of the invention as defined by the appended claims and their equivalents.

What is claimed is:

1. A method for transporting data packets in a network, comprising:

receiving subframes entering the network from an ingress node, wherein the subframes have a first forwarding path when entering the network;

analyzing, by the ingress node, the first forwarding path of the subframes, wherein the first forwarding path of the subframes includes the ingress node of the subframes, an egress node of the subframes and intermediate nodes between the ingress node and the egress node; wherein the egress node is the node from which the subframes exit the network, the intermediate nodes are the nodes through which the subframes pass from the ingress node to the egress node;

encapsulating, by the ingress node, the subframes that have the same ingress node, the same egress node and the same intermediate nodes into a first multiframe; wherein the same intermediate nodes include a first intermediate node, a second intermediate node, a third intermediate node between the ingress node and the first intermediate node, a fourth intermediate node between the second intermediate node and the egress node, a fifth intermediate node between the first intermediate node and the second intermediate node;

transporting the first multiframe from the ingress node to the first intermediate node via the third intermediate node;

receiving, at the first intermediate node, a second multiframe, the second multiframe have a second forwarding path that includes the first intermediate node, the second intermediate node and the third intermediate node;

encapsulating, at the first intermediate node, the first multiframe with the second multiframe so as to form a secondary multiframe;

transporting the secondary multiframe from the first intermediate node to the second intermediate node via the fifth intermediate node;

de-encapulating, at the second intermediate node, the first multiframe and the second multiframe from the secondary multiframe;

transporting the first multiframe from the second intermediate node to the egress node via the fourth intermediate node; and de-encapsulating, at the egress node, the first multiframe into the subframes having the first forwarding path.

2. The method for transporting data packets according to claim 1, wherein the encapsulating the subframes that have the same ingress node, the same egress and the same intermediate nodes into a first multiframe comprises:
encapsulating the subframes;
padding the encapsulated subframes into a multiframe;
encapsulating the multiframe in the form of a payload; and
mapping the encapsulated multiframe to a network transport layer.

3. The method for transporting data packets according to claim 2, wherein the padding the encapsulated subframes into the multiframe comprises adding padding bytes to the multiframe if the multiframe is not filled up within a predetermined period of time.

4. The method for transporting data packets according to claim 2, wherein the encapsulating the subframes comprises encapsulating by employing length indication or encapsulating by employing General Framing Procedure.

5. The method for transporting data packets according to claim 2, wherein the padding the encapsulated subframes into the multiframe further comprises adding a multiframe identification for identifying the multiframe.

6. The method for transporting data packets according to claim 1, wherein the first forwarding path is searched according to a label in an Multiprotocol Label Switch packet, an IP address, or at least one of a destination Media Access Control address in an Ethernet frame and a Virtual Local Area Network label.

7. The method for transporting data packets according to claim 1, wherein the transporting the first multiframe from the second intermediate node to the egress node via the fourth intermediate nodes comprises performing multiframe forwarding, traffic policing, priority scheduling on the network transport layer by the second intermediate node and the fourth intermediate node.

8. The method for transporting data packets according to claim 1, wherein the de-encapsulating the first multiframe into the subframes comprises de-encapsulating the encapsulation of the multiframe on the network transport layer, delineating the subframes, and de-encapsulating the subframes from the multiframe.

9. The method for transporting data packets according to claim 1, wherein encapsulating, by the ingress node, the subframes that have the same ingress node, the same egress node and the same intermediate nodes into the first multiframe includes the processes of subframe encapsulating, multiframe assembling and padding, and multiframe encapsulating;
wherein in the subframe encapsulation process, the subframes are encapsulated by adding a General Framing Procedure (GFP) Frame Check Sequence (FCS) to the beginning of a subframe data and adding a GFP header to the end of the subframe data, the subframes includes a GFP core header and a GFP payload area, the GFP core header is of 4 bytes, the GFP core header includes a payload length indication (PLI) of 16 bits and a core header error check (cHEC) of 16 bits, the PLI represents a total number of bytes contained in the GFP payload area, which has a minimum value of 4, the first to the third bytes contained in the GFP payload area are reserved for a GFP control frame, the cHEC of 2 bytes employs CRC-16 check to protect the integrity of the core header, the cHEC is used to correct single-bit errors and to detect multi-bit errors, the generation polynomial of the cHEC is $G(x)=x16+x12+x5+1$, where an initialized value is 0, the coefficient of x16 is a Most Significant Bit (MSB), and the coefficient of x0 is a Least Significant Bit (LSB); the GFP payload area, which contains all bytes except those contained in the GFP core header, is used for transporting high-level client information.

10. The method for transporting data packets according to claim 9, the GFP payload area have a length of 4-65535 bytes, the GFP payload area consists of a payload header, a client payload information field, the payload header is capable of managing data links related to high-level client signals; the GFP payload header consists of a type field and a type-Header Error Check (tHEC), the type field indicates whether there exists an extended header and its structure; The tHEC is used for protecting the integrity of the type field.

11. A network node in a network, comprising:
a receiving unit for receiving subframes entering the network from the network node;
a subframe analyzing unit, for analyzing a first forwarding path of the subframes to determines an ingress node of the subframes, an egress node of the subframes and intermediate nodes between the ingress node and the egress node; wherein the egress node is the node from which the subframes exit the network, the intermediate nodes are the nodes through which the subframes pass from the ingress node to the egress node; and
a multiframe processing unit, for encapsulating said subframes with the same ingress node, the same egress node and the same intermediate nodes into a first multiframe, wherein the same intermediate nodes include a first intermediate node, a second intermediate node, a third intermediate node between the ingress node and the first intermediate node, a fourth intermediate node between the second intermediate node and the egress node, a fifth intermediate node between the first intermediate node and the second intermediate node; wherein the first multiframe is transported from the ingress node to the first intermediate node via the third intermediate node; the first multiframe is encapsulated with a second multiframe so as to form a secondary multiframe at the first intermediate node;
wherein the second multiframe is received at the first intermediate node; the second multiframe have a second forwarding path that includes the first intermediate node, the second intermediate node and the third intermediate node; and the second multiframe is transported from the first intermediate node to the second intermediate node via the fifth intermediate node; the first multiframe and the second multiframe is de-encapulated from the secondary multiframe at the second intermediate node, the first multiframe is transported from the second intermediate node to the egress node via the fourth intermediate node, and the first multiframe is de-encapsulated into the subframes having the first forwarding path at the egress node.

12. The network node according to claim 11, wherein the multiframe processing unit comprises:

a subframe encapsulating unit, for encapsulating the subframes that have the same ingress node, the same egress and the same intermediate nodes;

a multiframe padding unit, for padding the encapsulated subframes into the multiframe;

a multiframe encapsulating unit, for encapsulating the multiframe in the form of a payload and mapping the encapsulated multiframe to a network transport layer; and a multiframe identification adding unit, for adding a multiframe identification for identifying the multiframe after padding the encapsulated subframes into the multiframe.

* * * * *